United States Patent
Zhang

(10) Patent No.: US 12,483,393 B2
(45) Date of Patent: Nov. 25, 2025

(54) METHOD OF CONTROLLING REMOTE DATA BASED ON CONFIDENTIAL COMPUTING AND SYSTEM THEREOF

(71) Applicant: Nanhu Laboratory, Zhejiang (CN)

(72) Inventor: Lei Zhang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 19/004,413

(22) Filed: Dec. 29, 2024

(65) Prior Publication Data
US 2025/0226975 A1    Jul. 10, 2025

(30) Foreign Application Priority Data
Jan. 8, 2024 (CN) .......................... 202410023010.0

(51) Int. Cl.
*H04L 9/08*  (2006.01)
*H04L 9/30*  (2006.01)
*H04L 9/32*  (2006.01)

(52) U.S. Cl.
CPC .......... *H04L 9/0825* (2013.01); *H04L 9/0861* (2013.01); *H04L 9/3073* (2013.01); *H04L 9/3213* (2013.01)

(58) Field of Classification Search
CPC ... H04L 9/0825; H04L 9/0861; H04L 9/3073; H04L 9/3213
See application file for complete search history.

(56) References Cited

U.S. PATENT DOCUMENTS

2022/0108026 A1* 4/2022 Ortiz .................. G06F 12/1441

FOREIGN PATENT DOCUMENTS

CN    111090876 A  *  5/2020  ........... G06F 21/602
CN    114553603 A  *  5/2022  ......... H04L 63/0442

OTHER PUBLICATIONS

Chinese First Office Action with English Translation, Application No. 202410023010.0, Issue No. 2024022100907550, Applicant: Nanhu Laboratory, Title: Method of Controlling Remote Data Based on Confidential Computing and System Thereof, Dated: Febuary 21, 2024.

Chinese Notification to Grant Patent Right for Invention with English Translation, Application No. 202410023010.0, Issue No. 2024030801470890, Applicant: Nanhu Laboratory, Title: Method of Controlling Remote Data Based on Confidential Computing and System Thereof, Dated: Mar. 8, 2024.

* cited by examiner

*Primary Examiner* — Alexander Lagor
*Assistant Examiner* — Lydia L Noel
(74) *Attorney, Agent, or Firm* — Reising Ethington P.C.

(57) ABSTRACT

Provided is a method of controlling remote data based on confidential computing and a system thereof. The method includes: sending, by a data provider, a public key P to a Proxy Module (PM) operating in a confidential computing environment of a data consumer; sharing, by the data provider, shared data D to the PM; creating, by the PM, a secret key K for data D, and carrying out trusted encryption sealing; using, by the data provider, a secret key S to generate a token T for a data control signal, and sending the token to the PM; parsing, by the PM, the data control signal contained in T; carrying out, by the PM, corresponding control on the corresponding data D; using, by the PM, a secret key S' to carry out trusted signature on an operation result and sending the operation result to the data provider; obtaining the operation result.

5 Claims, 2 Drawing Sheets

METHOD OF CONTROLLING REMOTE DATA BASED ON CONFIDENTIAL COMPUTING AND SYSTEM THEREOF

CROSS-REFERENCE TO RELATED PRESENT DISCLOSURE

This patent application claims the benefit and priority of Chinese Patent Present disclosure No. 202410023010.0, filed with the China National Intellectual Property Administration on Jan. 8, 2024, the disclosure of which is incorporated by reference herein in its entirety as part of the application.

TECHNICAL FIELD

The present disclosure belongs to the field of cross-domain data sharing, in particular to a method of controlling remote data based on confidential computing and a system thereof.

BACKGROUND

Privacy computing or confidential computing based on a Central Processing Unit (CPU) level is one of the most advanced technologies in the field of information security in recent years, which refers to a trusted execution environment based on chip-level trusted base, and is not controlled by a system layer and a kernel layer (that is, the data and operation in the security environment cannot be viewed, tampered with or controlled in the case of the highest management authority of a computer system or the right of control at the kernel level), so as to ensure the security of data privacy protection and the trustworthiness of operation in the trusted execution environment. At present, the corresponding technologies include Intel SGX (Software Guard Extensions) technology, AMD SEV (Secure Encrypted Virtualization) technology, Haiguang CSV (China Secure Virtualization), ARM V9 CCA (Confidential Compute Architecture) and so on. The confidential computing technology has been widely used in general-purpose chips and integrated into general-purpose computers and servers in the market, such as Xeon servers from Intel and third-generation servers from Haiguang. Therefore, first, the confidential computing/privacy computing based on the CPU level is based on the current general chips (such as Intel general chips based on Intel SGX technology). At the same time, the two most important features of confidential computing/privacy computing based on the CPU level are as follows.

1) Privacy protection: the encrypted data is only decrypted in the highly trusted environment (the encrypted memory) based on the CPU-level TEE to support the computing. After the computing, the related data in the highly trusted environment is destroyed, and the decrypted plaintext data will not be leaked in the whole process. For example, the privacy protection of the relevant signature key involved in the present disclosure is supported.

2) Computing trustworthiness: the data-based computing operates in the highly trusted environment (the encrypted memory) based on the CPU-level TEE, and no one (including the provider of the highest authority of the operating host or the right of control of the system kernel level) can invade the trusted execution environment at the CPU level to tamper with the computing. The highly trusted environment based on the CPU-level TEE will generate a proof (for example, in the form of a digital signature) of computing in the highly trusted environment.

Privacy computing has a very important function: the trusted sealing technology, such as Intel SGX sealing technology. The trusted sealing technology can directly generate a unique secret key by the CPU hardware through a signal set (the secret key is bound to the host hardware), encrypt privacy data based on the application enclave in the privacy computing security zone and writes the data into a disc permanently. The secret key cannot be obtained by the outsiders or those having the highest authority of the host.

The encrypted data can only be loaded, decrypted and used on the same host (because the secret key is bound to the host hardware) by the same application enclave (based on SGX MrEnclave) or the application enclave developed by the same application developer (based on SGX MrSigner) in such a manner that the CPU hardware generates the same decrypted secret key through the signal set.

At present, there is a great rigid demand for cross-domain trusted data sharing. However, there is a big problem in cross-domain data sharing at present: once the data crosses the domain, the data is no longer controlled by the data provider.

Laws and regulations such as General Data Protection Regulation (GDPR), Big Data Security Law, Personal Information Privacy Protection Law stipulate that data has the right to be forgotten, that is, a data provider can ask a data consumer to destroy data if desired, but it is difficult to technically prove that cross-domain data has been destroyed by others. That is, when some data need to be deleted, the data provider cannot ensure that these shared data are destroyed by the data consumer, and the data consumer cannot prove to the data provider that the data that the data provider requires to destroy is really destroyed.

SUMMARY

The purpose of the present disclosure is to provide a method of controlling remote data based on confidential computing and a system thereof, and to provide a verifiable proof that the data is effectively controlled.

A method of controlling remote data based on confidential computing is provided, wherein the method includes:

S1, generating, by a data provider, a public-secret key pair P-S, and sending a public key P to a security proxy module PM operating in a confidential computing environment of a data consumer;

S2, sharing, by the data provider, shared data D to the security proxy module PM in the confidential computing environment of the data consumer based on an encryption tunnel established by the confidential computing remote attestation;

S3, creating, by the security proxy module PM, a secret key K for the received data D, so that the data D is safely stored as encrypted data ED and is written into a disc for storage, and carrying out trusted encryption sealing on the secret key K;

S4, using, by the data provider, a secret key S in the public-secret key pair to sign a data control signal and generate a token T, and sending T to the security proxy module PM;

S5; verifying, by the security proxy module PM, the legitimacy of T based on the public key P, and parsing the data control signal from the data provider contained in T;

S6, carrying out, by the security proxy module PM, corresponding control on the corresponding data D based on the data control signal;

S7, using, by the security proxy module PM after the control, its own secret key S' to carry out trusted signature on an operation state and an operation result and sending the operation state and the operation result to the data provider;

S8, verifying, by the data provider, the legitimacy of a signature file based on a public key P' corresponding to the secret key S' and obtaining the operation result and the operation result of the related data D.

In the method of controlling remote data based on confidential computing, in Step S1, the data provider sends the public key P to the security proxy module PM based on a secure encryption tunnel, and the security proxy module PM carries out trusted encryption sealing on the received public key P.

In the method of controlling remote data based on confidential computing, after Step S3, the method further includes:

decrypting, by the security proxy module PM, the corresponding data D at the request of the application APP, which is also operating in the confidential computing environment, of the data consumer, and allowing the application APP to use the data D in the confidential computing environment;

the data control signal includes, but is not limited to, a signal to destroy data D, a signal to destroy part of data, and an operation signal such as disabling data, setting the use period when data can only be used, and setting the data to be used only by one or some applications (based on application hash values).

In the method of controlling remote data based on confidential computing, when the security proxy module PM receives a plurality of sets of data shared by the data provider to the data consumer, a corresponding secret key Ki is created for each set of data Di, and a corresponding relationship between each set of data Di and the corresponding secret key Ki is established. The plurality of sets of data can be shared to data consumers at several times or at one time.

In the method of controlling remote data based on confidential computing, the data consumer records an identifier of each set of data Di, the application APP determines a corresponding identifier according to usage requirements, and requests the corresponding data Di from the security proxy module PM based on the identifier. The indexer is used to facilitate the application to retrieve each set of data, which can be in the form of indexes or other forms.

The security proxy module PM decrypts the corresponding data Di at the request of the application APP, which is also operating in the confidential computing environment, of the data consumer, and allows the application APP to use the data Di in the confidential computing environment;

the data control signal includes, but is not limited to, a signal to destroy data D, a signal to destroy part of data, and an operation signal such as disabling data, setting the use period when data can only be used, and setting the data to be used only by one or some applications (based on application hash values). In Step S6, the security proxy module PM carries out corresponding control on the corresponding data D based on the data control signal. The security proxy module PM uses its own secret key S' to carry out trusted signature on an operation state and an operation result and send the operation state and the operation result to the data provider. Accordingly, in Step S8, the data provider verifies the legitimacy of a signature file based on a public key P' corresponding to the secret key S' and obtains the operation result and the operation result of the related data Di.

In the method of controlling remote data based on confidential computing, the application APP and the security proxy module PM operate in the confidential computing environment of the same host;

alternatively, the application APP and the security proxy module PM operate in confidential computing environments of different hosts, and a secure encryption tunnel for data transmission is established between the application APP and the security proxy module PM.

In the method of controlling remote data based on confidential computing, the security proxy module PM is deployed by the data provider to the data consumer and operates in the confidential computing environment of the data consumer;

the data consumer has a white list of hash values loaded by the PM, verifies the legitimacy of the security proxy module PM via technical means such as confidential computing local attestation/remote attestation or trusted start (such as a Trusted Platform Module (TPM) or a virtual Trusted Platform Module (vTPM)) based on the hash values that the security proxy module PM starts to load, and refuses the PM to operate when the verification fails. In this way, the disguised PM of the virus program module can be prevented, and the virus can be prevented from attacking the host and data resources of the data consumer. Of course, when the security proxy module PM is not operating, data cannot be obtained, so that the data consumer must operate the legitimate PM module to obtain data.

In the method of controlling remote data based on confidential computing, for each set of data Di, the data provider defines the maximum number of uses Xi, and notifies the security proxy module PM deployed at the data consumer, and the value of Xi is stored as a value that is only capable of being modified by the security proxy module PM. For example, the PM encrypts and persists Xi locally through the chip-level sealing technology. Every time there is a change, the PM updates and re-encrypts and persists Xi locally, so that other modules cannot tamper with Xi;

whenever any application APP of the data consumer uses the data Di once, the security proxy module PM subtracts one from its corresponding Xi, and when Xi=0, the security proxy module PM no longer responds to the request from any application APP for using the data Di.

In the method of controlling remote data based on confidential computing, when Xi is less than the set value, Xi is reassigned by the data provider. If malicious disconnection is carried out, Xi cannot be assigned. Xi cannot use data after consumption. The value can be set as 1.

Reassignment means that when Xi is less than the set value, Xi is assigned by the data provider, and Xi is updated by the security proxy module PM at the data consumer. Specifically, when Xi is less than the set value, Xi is assigned by the data provider voluntarily, or at the automatic or passive request of the data consumer, or at the automatic request of the security proxy module PM deployed in the data consumer, and is notified to the security proxy module PM deployed in the data consumer. This is mainly used in general scenarios to prevent the data provider from carrying out malicious disconnection.

Alternatively, the data consumer requests assignment from the data provider through the security proxy module PM as required, the data provider assigns Xi according to the request, and Xi is updated by the security proxy module PM at the data consumer. That is, the data consumer can also request the data provider to assign Xi at any time. This can be used in general scenarios to prevent the data provider from carrying out malicious disconnection, and can also be applied to scenarios where data is given with a value.

The assignment request initiated by the data consumer is initiated to the data provider through the security proxy module PM.

Preferably, the security proxy module PM sends a heartbeat packet to the data provider based on a heartbeat mechanism, and the data provider makes a heartbeat packet reply to the security proxy module;

the heartbeat packet contains a query about whether to send a control signal, and the heartbeat packet reply contains a control signal or a no-op signal for the query.

The assignment request can be loaded on the heartbeat packet of the security proxy module. The response of the data provider to the assignment request can be loaded in the heartbeat packet reply.

If the data consumer is normally connected with the data provider, the data provider will normally receive the heartbeat of the security proxy module PM. When receiving the assignment request sent by the security proxy module PM to the data provider, the corresponding result can be returned to the assignment request. A no-op signal is returned when querying about the control signal, that is, no operation. At this time, recharge is carried out normally.

The malicious interruption from the data consumer means that the data provider will not receive the heartbeat, and then the data provider can take some actions. For example, when the heartbeat packet is received the next time, the heartbeat packet reply will be used to return to the set control signal, such as disabling the data immediately. In this way, the data consumer can be effectively prevented from being connected with the data provider only by assigning Xi, and the data consumer can be prevented from escaping the control signal sent by the data provider by disconnecting immediately after the assignment.

In addition, based on the heartbeat mechanism, the security proxy module PM can infer that the data consumer maliciously interrupts when sending heartbeat packet without reply, and can take some actions actively based on the settings, such as disabling the data immediately.

"Assignment" can be to set Xi as the initial defined value or as other values as required, such as adding a specified value to Xi based on the current Xi. The data provider assigns Xi, which can be a common signal or a signature signal Token T similar to Step S4. The assignment signal is signed by its secret key S and is sent to the security proxy module PM of the data consumer.

The data control signal contains control corresponding to the Xi range, and the security proxy module PM carries out corresponding control on the corresponding data Di according to the data control signal and the current Xi value of the corresponding data Di.

A system of controlling remote data based on confidential computing is provided, including a data consumer and a data provider, wherein the data consumer is deployed with a computer confidential environment and has a security proxy module PM provided by the data provider and operating in the computer confidential environment, and the data provider controls the data that has been shared to the data consumer through the method described above and obtains a verifiable proof of a control result of the remote data.

The present disclosure has the following advantages.

The data provider still has the right of controlling the data that has been shared to the data consumer, deletes the data or carries out other control operations independently, and obtains the proof that the data has been successfully operated according to its intention, thus effectively overcoming the problem in the prior art that the data provider loses control of the data once sharing the data to the data consumer across domains.

The verifiable proof that the cross-domain data has been operated correspondingly by the data provider is realized from the technical level. At present, even if the data consumer honestly operates the data correspondingly at the request of the data provider, there is no verifiable proof (such as destroying the data based on the right of forgetting the data). This scheme perfectly solves this problem.

DETAILED DESCRIPTION OF THE EMBODIMENTS

The present disclosure will be further described in detail with reference to the attached drawings and the detailed description hereinafter.

Figure 1:
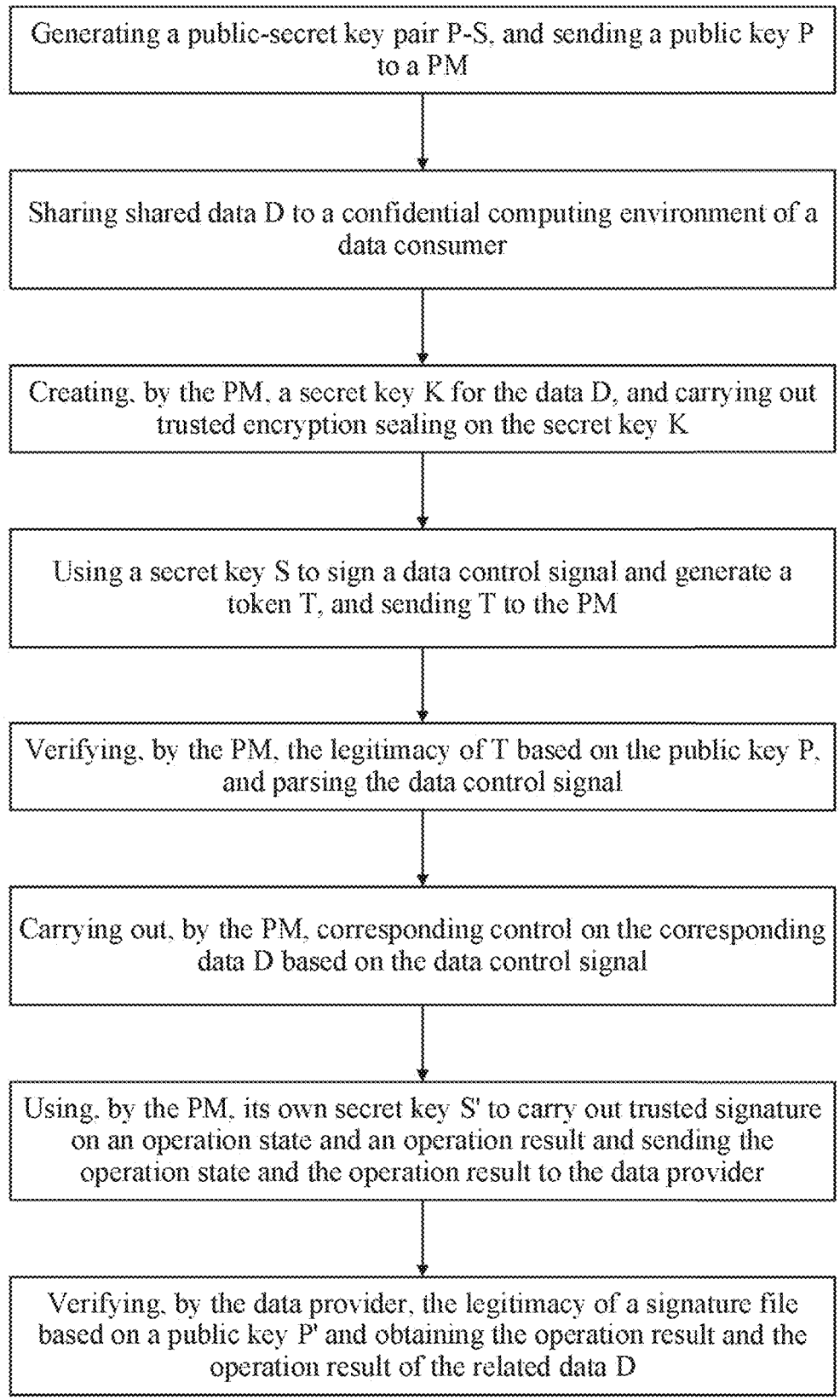
FIG. 1 is a flow chart of a method of controlling remote data based on confidential computing according to the present disclosure.
Figure 2:
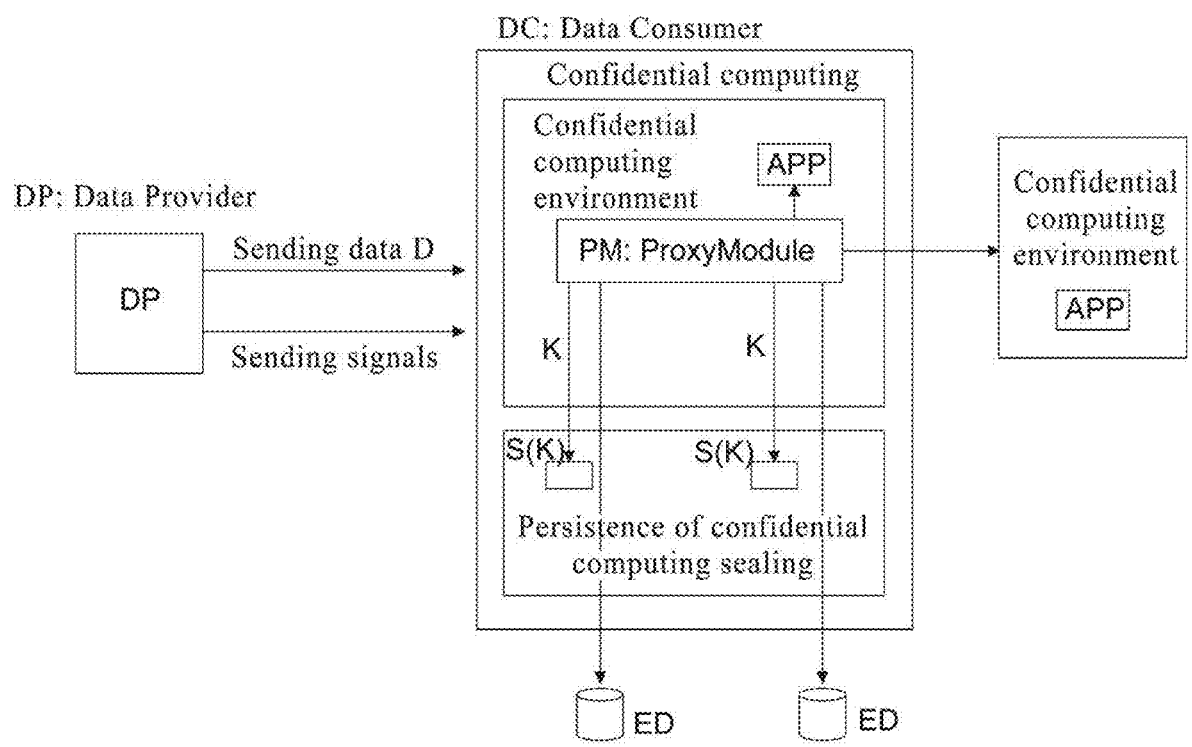
FIG. 2 is a flow chart of the architecture and the implementation of a system of controlling remote data based on confidential computing according to the present disclosure.

As shown in FIG. 1 and FIG. 2, this scheme provides a method of controlling remote data based on confidential computing and a system of implementing the method, which realizes the control of data shared by the data provider to the data consumer. The specific implementation method is as follows.

1. The data consumer deploys a confidential computing hardware environment, and the PM (proxy module, that is, a security proxy module deployed by the data provider at the data consumer) operates in the confidential computing environment.

2. When the PM module is started, the data consumer verifies its legitimacy based on the remote attestation or local attestation of standard functions in trusted computing or confidential computing (for example, based on the hash measurement of the PM application layer).

So far, it can be noted that the PM operates at the data consumer and in the confidential computing environment, so that it is not controlled by the data consumer. However, based on the verification of its start, it can be guaranteed that PM will not attack the data consumer DC beyond its own job function (described in the following steps).

3. The data provider DP establishes confidential computing remote attestation with the PM module of the confidential computing environment of the data consumer DC, and confirms the legitimacy of the confidential computing environment of the PM module (for example, it is confirmed that the confidential computing environment is valid and legal, and the hash value that is loaded into the memory by the PM is on the white list of the DP). After the legitimacy verification based on remote attestation passes, the DP establishes a secure encryption tunnel with the confidential computing environment of the PM module, for example, based on the Remote Attestation-Transport Layer Security (RA-TLS) mechanism.

4. The DP generates a public-secret key pair (a public key P and a secret key S), and sends its public key P to the PM in the confidential computing environment of the DC based on the encryption tunnel.

5. The PM carries out trusted encryption sealing on P based on confidential computing trusted sealing technology. After the system is restarted, the encrypted and sealed P can only be safely read by the PM in the confidential computing environment.

6. Data starts to be shared across domains, and the DP sends data (D) to the PM module of the confidential computing environment of the DC based on the encryption tunnel.

7. In the confidential computing environment of the DC, the PM receives the data D and creates a secret key K, so that the data D is safely stored as encrypted data ED.

8. The PM carries out trusted encryption sealing on K as S (K) based on the confidential computing trusted sealing technology, and the encrypted and sealed S (K) can only be safely read by the PM in the confidential computing environment after the system is restarted.

The data provider can share a plurality of sets of different data Di to the data consumer.

The plurality of sets of data shared by the data provider to the data consumer can be uniformly encrypted and stored, that is, new data Di can be added to the existing data set and stored again with the secret key K.

A corresponding secret key Ki can also be created by the PM in the confidential computing environment for each set of newly received data Di. The PM maintains the corresponding relationship between different data Di and Ki in the encrypted memory. The mapping table of Di and Ki can be encrypted and sealed by the confidential computing trusted sealing technology. This embodiment is preferably described in this way, and this way is used as an example for explanation hereinafter.

A plurality of sets of data can be shared to the data consumer at one time or at several times, which is not limited here.

9. When data needs to be used by a trusted application APP operating in the confidential computing environment, the PM decrypts the corresponding data at the request of the corresponding application APP, and transmits the corresponding data to the corresponding application APP through an encryption tunnel established safely based on the chip level. If the data is uniformly encrypted and stored, the application APP can use all the data that has been shared by the provider to the consumer. If the data is stored in sets, the PM decrypts the corresponding Di based on the index of Di according to the usage requirements of the APP.

The application APP and the security proxy module PM can operate in the confidential computing environment of the same host.

Alternatively, the application APP and the security proxy module PM operate in confidential computing environments of different hosts.

A secure encryption tunnel for data transmission is established between the application APP and the security proxy module PM.

Before establishing a secure encryption tunnel between the PM and the APP, the legitimacy of the application APP can be verified first, and the form of legitimacy verification is not limited here. For example, the hash of the application APP or the developer information can be verified based on the confidential computing remote attestation.

10. After the cross-domain data sharing is realized hereinafter, the DP can still remotely control the data and generate a chip-level verifiable proof.

The DP sends a signal (parameter) to control the data, and signs it with S to generate token T. The parameter information includes which data Di is to be operated and what operation is to be performed. The operation may represent destroying, partially destroying, and disabling data, or represent other operation signals of data (for example, setting the use period when the data can only be used, setting the data to be used only by one or some applications (based on application hash values), and other operation signals).

11. The DP establishes an encryption tunnel with the PM module in the confidential computing environment of the DC (based on remote attestation) and sends T to the PM.

12. The PM verifies the legitimacy of T based on P in the encrypted memory, and confirms that the signal does come from the DP. PM parses the signal (parameter) from the DP contained in T.

13. The PM is not controlled by the data consumer because of operating in the confidential computing environment. The PM can carry out data operation based on Signal (parameter). For example, if the signal is to destroy the data Di, the PM can delete the entire Di data set and permanently destroy Ki, including the encrypted value that Ki seals in a trusted manner. At the same time, the PM can detect whether the data which has been written in a disc after being encrypted is illegally copied in real time. If the signal is to disable the data Di, the PM can refuse the request of the application APP to call the data (or disable the data by assigning Xi=0, referring to the description of Xi below), and the PM no longer transmits the corresponding data to the APP. If the signal is to delete part of the data, the PM can delete the Di data which has been encrypted, sealed and written in a disc.

The specific operations on data can be customized by users and embodied in the Signal (parameter) function.

14. After implementing the data control operation, the PM carries out trusted signature on the operation state and the operation result based on the secret key S' in the PM of confidential computing (the key generated by the PM in the chip-level confidential computing security environment can be safely stored by confidential computing trusted sealing).

15. The signature report is sent back to the DP. The DP can verify the legitimacy based on the public key P' pre-stored in the data provider corresponding to the PM signature, and can verify whether the operation of the remote PM on related data is successfully completed. Therefore, the DP can remotely control the data that has been shared and used, and confirm based on the verifiable proof whether the operation has been completed in a trusted manner.

Further, this scheme further includes that the PM introduces the residual number mechanism for each set of data Di. That is, each set of data Di will correspond to Xi, and Xi represents that Di data can be used for Xi times at most. The initial value of Xi can be defined by the DP. Xi can only be assigned when the DP and the PM are connected in a trusted manner based on remote attestation. That is, the value of Xi can be increased.

If the DC is maliciously disconnected from the DP, the data Di will be forced to be disabled after being used for X times (after Xi=0). Only after the PM and the DP are reconnected through remote attestation in a trusted manner, and after the data provider agrees at the request of the DC, Xi can be assigned (assigning Xi>=1) to release the data used by the data consumer. For example, if X1 defined by the DP for the data D1 is 5, the value of X1 will be reduced by 1 every time the data consumer uses the data D1. When the value of X1 is 0, the PM will not decrypt the data D1 for any application of the data consumer, and the data consumer cannot be use the data any longer. When the value of X1 is 0 or a set value close to 0, the data consumer DC requests assignment from the DP based on the PM. If the DC is maliciously disconnected from the DP, Xi cannot be assigned, which can effectively solve the problem that the DP cannot send the data remote control signal if the DC is maliciously disconnected from the DP.

The operation of assigning Xi can also be connected with the value of data elements. For example, assignment of Xi means that the data consumer pays the data provider according to the number of times as expected.

Preferably, the security proxy module PM sends a heartbeat packet to the data provider based on a heartbeat mechanism, and the data provider makes a heartbeat packet reply to the security proxy module. The heartbeat packet contains a query about whether to send a control signal, and the heartbeat packet reply contains a control signal or a no-op signal for the query. The assignment request can be loaded on the heartbeat packet of the security proxy module. The response of the data provider to the assignment request can be loaded in the heartbeat packet reply.

If the data consumer is normally connected with the data provider, the data provider can return the corresponding result to the assignment request when receiving the heartbeat packet with the assignment request and the control signal query sent by the security proxy module. A no-op signal is returned when querying about the control signal, that is, no operation. At this time, recharge is carried out normally.

The malicious interruption from the data consumer means that the data provider will not receive the heartbeat, and then the data provider can take some actions. For example, when the heartbeat packet is received the next time, the heartbeat packet reply will be used to return to the set control signal, such as disabling the data immediately. The control signal takes precedence over the response to the assignment request, and returning the control signal will also return the response to the assignment request failure. In this way, the data consumer can be effectively prevented from being connected with the data provider only by assigning Xi, and the data consumer can be prevented from escaping the control signal sent by the data provider by disconnecting immediately after the assignment.

In addition, based on the heartbeat mechanism, the security proxy module PM can infer that the data consumer maliciously interrupts when sending heartbeat packet without reply, and can take some actions actively based on the settings, such as disabling the data immediately. At the same time, the residual number mechanism can also be dynamically operated in combination with the value of Xi. For example, when the value of Xi<=N0, the data control operation A (such as the disabling operation) is executed. When N0<the value of Xi and Xi<=N1, the data control operation B (for example, the data is available, but its application scenario is limited, or its use period is limited) is executed. When N1<the value of Xi and Xi<=N2, the data control operation C (for example, the data is available, and there is no limit) is executed, and so on. The corresponding operation can be dynamically carried out according to the number of times of use.

The specific embodiments described in this embodiment are only illustrative of the spirit of the present disclosure. Those skilled in the field to which the present disclosure belongs can make various modifications or supplements to the described specific embodiments or substitute the described specific embodiments in a similar manner, which will not deviate from the spirit of the present disclosure or go beyond the scope defined in the appended claims.

What is claimed is:

1. A method of controlling remote data based on confidential computing, wherein the method comprises:

S1, generating, by a data provider, a public-secret key pair P-S comprising a public key P and a secret key S, and sending the public key P to a security proxy module PM operating in a confidential computing environment of a data consumer;

S2, sharing data D to the security proxy module PM in the confidential computing environment of the data consumer based on an encryption tunnel;

S3, creating, by the security proxy module PM, a secret key K for the data D, so that the data D is safely stored as encrypted data ED, and sealing the secret key K in a trusted encrypted environment; and decrypting, by the security proxy module PM, the encrypted data ED at a request of an application APP, which is also operating in the confidential computing environment, of the data consumer, and allowing the application APP to use the data D in the confidential computing environment;

S4, using the secret key S in the public-secret key pair to sign a data control signal and generate a token T, and sending the token T to the security proxy module PM, wherein the data control signal from the data provider comprises a signal to destroy the data D and a signal to destroy part of data;

S5; verifying, by the security proxy module PM, legitimacy of the token T based on the public key P, and parsing the data control signal from the data provider contained in the token T;

S6, controlling, by the security proxy module PM, the data D based on the data control signal;

S7, using, by the security proxy module PM after the controlling, its own secret key S' to sign an operation state and an operation result of the data D with a trusted signature, and sending the signed operation state and the signed operation result to the data provider;

S8, verifying, by the data provider, legitimacy of the signed operation state and the signed operation result based on a public key P' corresponding to the secret key S' to obtain the operation state and the operation result of the data D;

wherein when the security proxy module PM receives a plurality of sets of data shared by the data provider to the data consumer, a corresponding secret key Ki is created for each set of data Di, and a corresponding relationship between each set of data Di and the corresponding secret key Ki is established;

wherein for each set of data Di, the data provider defines the maximum number of uses Xi, and notifies the security proxy module PM deployed at the data consumer, and the value of Xi is stored as a value that is only capable of being modified by the security proxy module PM;

whenever any application APP of the data consumer uses the data Di once, the security proxy module PM subtracts one from its corresponding Xi, and when Xi=0, the security proxy module PM no longer responds to the request from any application APP for using the data Di;

wherein when Xi is less than the set value, Xi is assigned by the data provider, and Xi is updated by the security proxy module PM at the data consumer;

alternatively, the data consumer requests assignment from the data provider through the security proxy module PM as required, the data provider assigns Xi according to the request, and Xi is updated by the security proxy module PM at the data consumer;

the security proxy module PM sends a heartbeat packet to the data provider based on a heartbeat mechanism, and the data provider makes a heartbeat packet reply to the security proxy module;

the heartbeat packet contains a query about whether to send a control signal, and the heartbeat packet reply contains a control signal or a no-op signal for the query;

the data control signal contains control corresponding to the Xi range, and the security proxy module PM carries out corresponding control on the data Di according to the data control signal and the current Xi value of the data Di.

2. The method of controlling remote data based on confidential computing according to claim 1, wherein in Step S1, the data provider sends the public key P to the security proxy module PM based on a secure encryption tunnel, and the security proxy module PM seals the received public key P in the trusted encrypted environment.

3. The method of controlling remote data based on confidential computing according to claim 1, wherein the data consumer records an identifier of each set of data Di, the application APP determines a corresponding identifier according to usage requirements, and requests the data Di from the security proxy module PM based on the identifier;

the security proxy module PM decrypts the data Di at the request of the application APP, which is also operating in the confidential computing environment, of the data consumer, and allows the application APP to use the data Di in the confidential computing environment;

the data control signal comprises a signal to destroy specific data Di and a signal to destroy part of data.

4. The method of controlling remote data based on confidential computing according to claim 1, wherein the application APP and the security proxy module PM operate in the confidential computing environment of the same host;

alternatively, the application APP and the security proxy module PM operate in confidential computing environments of different hosts;

a secure encryption tunnel for data transmission is established between the application APP and the security proxy module PM.

5. The method of controlling remote data based on confidential computing according to claim 1, wherein the security proxy module PM is deployed by the data provider to the data consumer and operates in the confidential computing environment of the data consumer;

the data consumer has a white list of hash values loaded by the PM, verifies the legitimacy of the security proxy module PM based on the hash values that the security proxy module PM starts to load, and refuses the PM to operate when the verification fails.

\* \* \* \* \*